United States Patent
Langhammer et al.

(10) Patent No.: US 12,056,461 B2
(45) Date of Patent: Aug. 6, 2024

(54) INTEGRATED CIRCUITS WITH MACHINE LEARNING EXTENSIONS

(71) Applicant: Intel Corporation, Santa Clara, CA (US)

(72) Inventors: Martin Langhammer, Alderbury (GB); Dongdong Chen, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 17/484,845

(22) Filed: Sep. 24, 2021

(65) Prior Publication Data

US 2022/0012015 A1     Jan. 13, 2022

Related U.S. Application Data

(62) Division of application No. 15/818,298, filed on Nov. 20, 2017, now Pat. No. 11,175,892.

(51) Int. Cl.
*G06F 7/544*     (2006.01)
*G06F 7/485*     (2006.01)

(52) U.S. Cl.
CPC ............ *G06F 7/5443* (2013.01); *G06F 7/485* (2013.01); *G06F 2207/382* (2013.01); *G06F 2207/3824* (2013.01)

(58) Field of Classification Search
CPC .................. G06F 7/4876; G06F 7/5443; G06F 2207/3816–3824
See application file for complete search history.

(56) References Cited

U.S. PATENT DOCUMENTS

| 3,434,114 A | 3/1969 | Arulpragasam et al. |
| 4,916,651 A | 4/1990 | Gill et al. |

(Continued)

FOREIGN PATENT DOCUMENTS

| EP | 3159789 | 4/2017 |

OTHER PUBLICATIONS

Sabyasachi Das et al., "A Timing-Driven Synthesi Technique for Arithmetic Product-of-Sum Expressions", VLSI Design, 2008, VLSID 2208, 21st Inernational Confernec on VLSI Design, IEEE Computer Society, Piscataway, NJ, USA, Jan. 4, 2008 (Jan. 4, 2008), pp. 635-640, XP031230108, ISBN: 978-0-7695-3083-3.

(Continued)

*Primary Examiner* — Matthew D Sandifer
(74) *Attorney, Agent, or Firm* — Fletcher Yoder, P.C.

(57) ABSTRACT

An integrated circuit with specialized processing blocks are provided. A specialized processing block may be optimized for machine learning algorithms and may include a multiplier data path that feeds an adder data path. The multiplier data path may be decomposed into multiple partial product generators, multiple compressors, and multiple carry-propagate adders of a first precision. Results from the carry-propagate adders may be added using a floating-point adder of the first precision. Results from the floating-point adder may be optionally cast to a second precision that is higher or more accurate than the first precision. The adder data path may include an adder of the second precision that combines the results from the floating-point adder with zero, with a general-purpose input, or with other dot product terms. Operated in this way, the specialized processing block provides a technical improvement of greatly increasing the functional density for implementing machine learning algorithms.

17 Claims, 6 Drawing Sheets

(56) References Cited

U.S. PATENT DOCUMENTS

| | | | |
|---|---|---|---|
| 4,953,119 A * | 8/1990 | Wong | G06F 7/5338 |
| | | | 708/503 |
| 5,696,711 A | 12/1997 | Makineni | |
| 7,567,997 B2 | 7/2009 | Simkins et al. | |
| 7,746,109 B1 | 6/2010 | Young et al. | |
| 8,266,198 B2 | 9/2012 | Lee et al. | |
| 8,266,199 B2 | 9/2012 | Langhammer et al. | |
| 8,301,681 B1 | 10/2012 | Lee et al. | |
| 8,307,023 B1 | 11/2012 | Leung et al. | |
| 8,706,790 B1 | 4/2014 | Langhammer | |
| 8,949,298 B1 | 2/2015 | Langhammer | |
| 9,098,332 B1 | 8/2015 | Langhammer | |
| 9,104,474 B2 | 8/2015 | Kaul et al. | |
| 9,189,200 B1 | 11/2015 | Langhammer | |
| 9,207,908 B1 | 12/2015 | Langhammer | |
| 9,465,578 B2 | 10/2016 | Tannenbaum et al. | |
| 9,507,565 B1 | 11/2016 | Streicher et al. | |
| 9,904,514 B1 | 2/2018 | Czajkowski | |
| 10,042,607 B2 | 8/2018 | Langhammer | |
| 2005/0144212 A1 | 6/2005 | Simkins et al. | |
| 2006/0195496 A1 | 8/2006 | Vadi et al. | |
| 2006/0206557 A1 | 9/2006 | Wong et al. | |
| 2009/0049113 A1 | 2/2009 | Muff et al. | |
| 2010/0023568 A1 | 1/2010 | Hickey et al. | |
| 2010/0121898 A1 | 5/2010 | Swartzlander, Jr. et al. | |
| 2012/0290819 A1 | 11/2012 | Langhammer | |
| 2014/0188968 A1 | 7/2014 | Kaul et al. | |
| 2015/0169289 A1 | 6/2015 | Tannenbaum et al. | |
| 2017/0115958 A1 | 4/2017 | Langhammer | |
| 2018/0052661 A1 | 2/2018 | Langhammer | |

OTHER PUBLICATIONS

Teich, "Tearing Apart Google's TPU 3.0 AI Processor", The Next Platform, May 10, 2018 <https://www.nextplatform.com/2018/05/10/tearing-apart-googles-tpu-3-0-ai-coprocessor/>.

Wikipedia contributors. "Bfloat16 floating-point format." Wikipedia, the Free Encyclopedia, Wikipedia, the Free Encyclopedia, Sep. 26, 2018. Web. Sep. 26, 2018 <https://en.wikipedia.org/wiki/Bfloat16_floating-point-format>.

A. R. Lopes and G. A. Constantinides, "A fused hybrid floating-point and fixed-point dot-product for FPGAs," In Proc. Int. Symp. on Applied Reconfigurable Recomputing pp. 157-168, 2010 (Year: 2010).

M. Gok and M.M. Ozbilen, "Multi-Functional Floating-Point MAF Designs with Dot Product Support," Microelectronics J., vol. 39, pp. 30-43, Jan. 2008 (Year:2008).

J. Sohn and E.E. Swartzlander, "Improved architectures for a floating-point fused dot product unit", Proc. IEEE 21st Symp. Comput.Arithmetic, pp. 41-48, Apr. 2013 (Year: 2013).

* cited by examiner

INTEGRATED CIRCUITS WITH MACHINE LEARNING EXTENSIONS

This application is a divisional of U.S. patent application Ser. No. 15/818,298, filed Nov. 20, 2017, which is hereby incorporated by reference herein in its entirety.

BACKGROUND

This invention relates generally to integrated circuit and in particular, to programmable logic devices with multiplier circuitry.

Programmable logic devices (PLDs) include logic circuitry such as look-up tables (LUTs) and sum-of-product based logic that are designed to allow a user to customize the circuitry to the user's particular needs. This configurable logic is typically divided into individual logic circuits that are referred to as logic elements (LEs). The LEs may be grouped together to form larger logic blocks referred to as logic array blocks (LABs) that may be configured to share the same resources (e.g., registers and memory). In addition to this configurable logic, PLDs also include programmable interconnect or routing circuitry that is used to connect the inputs and outputs of the LEs and LABs. The combination of this programmable logic and routing circuitry is referred to as soft logic.

Besides soft logic, PLDs may also include specialized processing blocks that implement specific predefined logic functions and thus cannot be configured by the user. Such specialized processing blocks may include a concentration of circuitry on a PLD that has been partly or fully hardwired to perform one or more specific tasks, such as a logical or a mathematical operation. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), and logic AND/NAND/OR/NOR arrays.

One particularly useful type of specialized processing block that has been provided on PLDs is a digital signal processing (DSP) block. A conventional DSP block includes two 18-by-18 multipliers, which can be combined with other internal circuitry to serve as a 27-by-27 multiplier. The 27-by-27 multiplier is used as part of an IEEE 754 single precision floating-point multiplier, which requires 23 bits of precision. The DSP block can also use the two 18-by-18 multipliers to support two separate multiplication operations. In certain applications such as machine learning applications, it may be desirable to configure the DSP block to support even smaller precisions relative to their counterparts used for general purpose applications, such as to implement an 11-by-11 unsigned multiplier with the DSP block.

It is within this context that the embodiments described herein arise.

DETAILED DESCRIPTION

The embodiments presented herein relate to integrated circuits and, more particularly, to multipliers on a programmable integrated circuit. The programmable integrated circuit may include a backwards compatible digital signal processing (DSP) block configured to implement floating-point 16 (FP16) operators for supporting machine learning training procedures such as Convolution Neural Network algorithms (or Recursive Neural Network inference algorithms) and also to implement integer operators for supporting machine learning inference procedures with minimal cost and power impact. A DSP block that is operable to support multiple smaller precision floating-point operations in a first mode (e.g., during a machine learning training phase) and multiple smaller precision integer operations in a second mode (e.g., during a machine learning inference phase) provides a technical improvement of greatly increasing the functional density of machine learning algorithms.

It will be recognized by one skilled in the art, that the present exemplary embodiments may be practiced without some or all of these specific details. In other instances, well-known operations have not been described in detail in order not to unnecessarily obscure the present embodiments.

Figure 1:
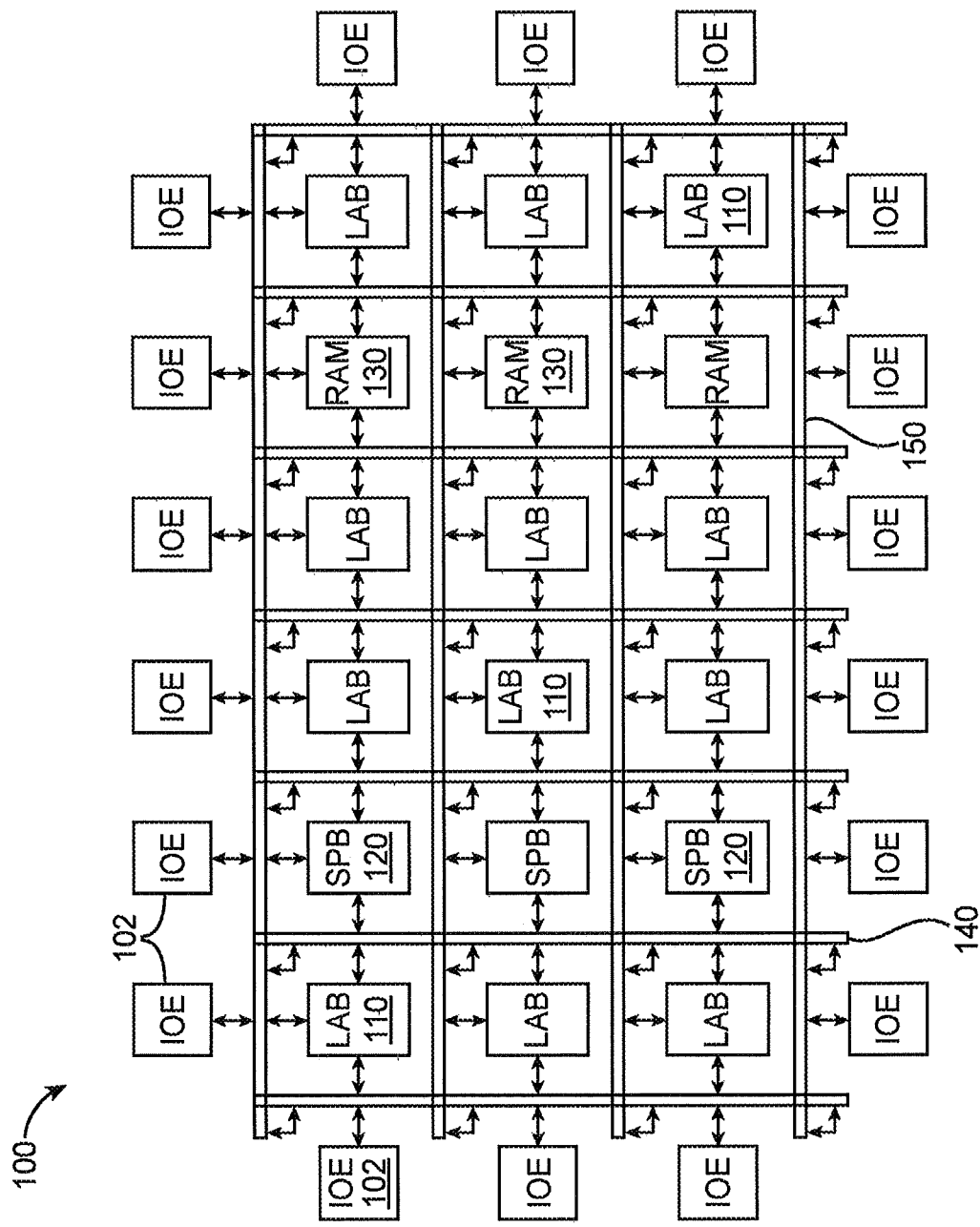
FIG. 1 is a diagram of an illustrative integrated circuit having specialized processing blocks in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and specialized processing blocks such as specialized processing blocks (SPB) 120. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of device 100 and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that the embodiments described herein may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Specialized processing block 120 (sometimes referred to as a digital signal processing block or "DSP" block) may sometimes be configured as a multiplier circuit. As an example, DSP block 120 may implement an 18-by-18 multiplier circuit, which can be used to support an IEEE 754 single precision floating-point multiplication operation.

Floating-point numbers are commonplace for representing real numbers in scientific notation in computing systems and are designed to cover a large numeric range and diverse precision requirements. The IEEE 754 standard is commonly used for floating-point numbers. A floating-point number includes three different parts: (1) the sign of the floating-point number, (2) the mantissa, and (3) the exponent. Each of these parts may be represented by a binary number and, in the IEEE 754 format, have different bit sizes depending on the precision. For example, a single precision floating-point number requires 32 bits, which are distributed as follows: one sign bit (bit 32), eight exponent bits (bits [31:24]), and 23 mantissa bits (bits [23:1]). A double precision floating-point number requires 64 bits including one sign bit (bit 64), 11 exponent bits (bits [63:53]), and 52 mantissa bits (bits [52:1]).

The sign of a floating-point number according to standard IEEE 754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is −127. For example a value of 140 for the exponent actually represents (140−127)=13, and a value of 100 represents (100−127)=−27. For double precision numbers, the exponent bias preferably is −1023.

As discussed above, according to the IEEE 754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Thus, the single precision format effectively has 24 bits of precision (i.e., 23 mantissa bits plus one implied bit). The single precision floating point arithmetic as defined by the IEEE 754 standard may be referred to as "FP32," since the single precision floating-point number requires 32 total number of bits to encode.

Recently, machine learning has become an important application area for programmable circuits, and conventional general-purpose DSP block are inefficient in terms of performance and power densities required for current machine learning designs. Machine learning can be split into two types of applications: (1) training and (2) inference. Training typically requires higher precisions, whereas inference requires relative lower precisions. Training determines the weights or coefficients by analyzing data (e.g., image data), whereas inference applies them. Training may use floating-point calculations, while inferencing may use fixed-point integer calculations. Both types of numbers used in the context of machine learning applications may have smaller precisions than their counterparts used for general purpose applications. Therefore, it would be advantageous to provide a DSP Block that is backwards compatible with general purpose applications, while at the same time being able to be configured to support smaller machine learning applications.

For machine learning applications such as Convolution Neural Networks (CNN), it may be more efficient if DSP block 120 is used to support arithmetic of smaller precision such as "FP16" arithmetic, which involves floating-point numbers with one sign bit, five exponent bits, and 10 mantissa bits. Including the implied leading bit, FP16 effectively has an 11-bit mantissa. In general, DSP block 120 may not only be configured to support FP32 and FP16, but may also be configured to support a wide range of intermediate precisions such as FP17, FP18, FP20, etc. Configured in this way, DSP 120 can support at least twice the functional density relative to general purpose FP32 operations.

Routing on device 100 is an expensive resource, sometimes more than the functional blocks (e.g., memory block 130 or DSP block 120) that it connects. Therefore, it can be very expensive to access smaller precision multipliers; any decomposition of larger multipliers into smaller multipliers must consider the cost of getting to and from the smaller multipliers. Since the ratio of input/output circuitry 102 to the core logic for smaller multipliers is much greater than for large multipliers, routing minimization can provide substantial savings.

In many machine learning implementations, dot products are often used, so the capability to sum up at least several multipliers is useful. There are various machine learning algorithms. Convolutional Neural Networks (CNNs) are commonly used for image analysis and use many small fixed-point 2D filters, typically requiring 3×3 multiplication, 5×5 multiplication, 7×7 multiplication, etc. Image data is often 8 bits, so fixed-point multipliers in this precision range may also be useful. On the other hand, Recurrent Neural Networks (RNNs) use larger vector-matrix multipliers, typically requiring floating-point operations. The vector sizes may be 64 or larger, possibly 128, 256, or even 1024 in length. The ability to build very large floating-point dot products may be useful.

In training, multiplications or the sum of multiplications are often accumulated. Smaller precision floating point such as FP16 will have a very limited precision and dynamic range, so information will quickly get lost accumulated in the native precision. Therefore, ability to accumulate in a wider precision is helpful. Another consideration is that all signaling (such as exception and error flags) must also be appropriately transferred between the smaller and larger floating point representations.

To summarize, a machine learning optimized block may be capable of supporting: (a) groups of small (e.g., 8×8 or 9×9) integer dot products; (b) groups of smaller floating-point (e.g., FP16) dot products, with the capability to build dot products with a very large number of elements; (c) the ability to accumulate dot products; (d) floating-point accumulation in a larger floating-point format; and (e) transferring error and exception information between different floating-point formats. In addition, these machine learning features should be at a modest cost (area) over the existing general-purpose features while not affecting current performance. Moreover, any power increase should be modest and only affect the general-purpose DSP data paths minimally.

Figure 2:
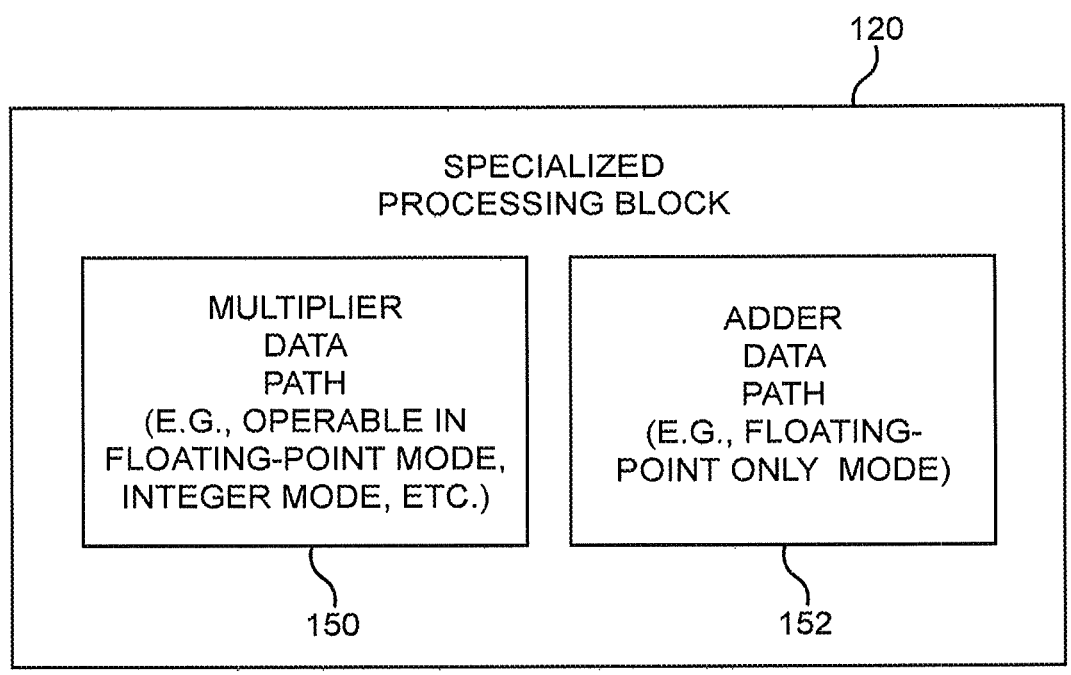
FIG. 2 is a diagram showing how an illustrative specialized processing block may include a multiplier data path and an adder data path in accordance with an embodiment.

A circuit block that is capable of providing all of these machine learning optimized features is shown in FIG. 2. As shown in FIG. 2, specialized processing block 120 may include a multiplier data path 150 and an adder data path 152. Multiplier data path 150 may be operable in a floating-point mode and an integer (e.g., fixed-point) mode to perform multiplication operations. Adder data path 152 may only be in use during the floating-point mode for summing floating-point results generated at the output of multiplier data path 150 with other floating-point values.

Figure 3:
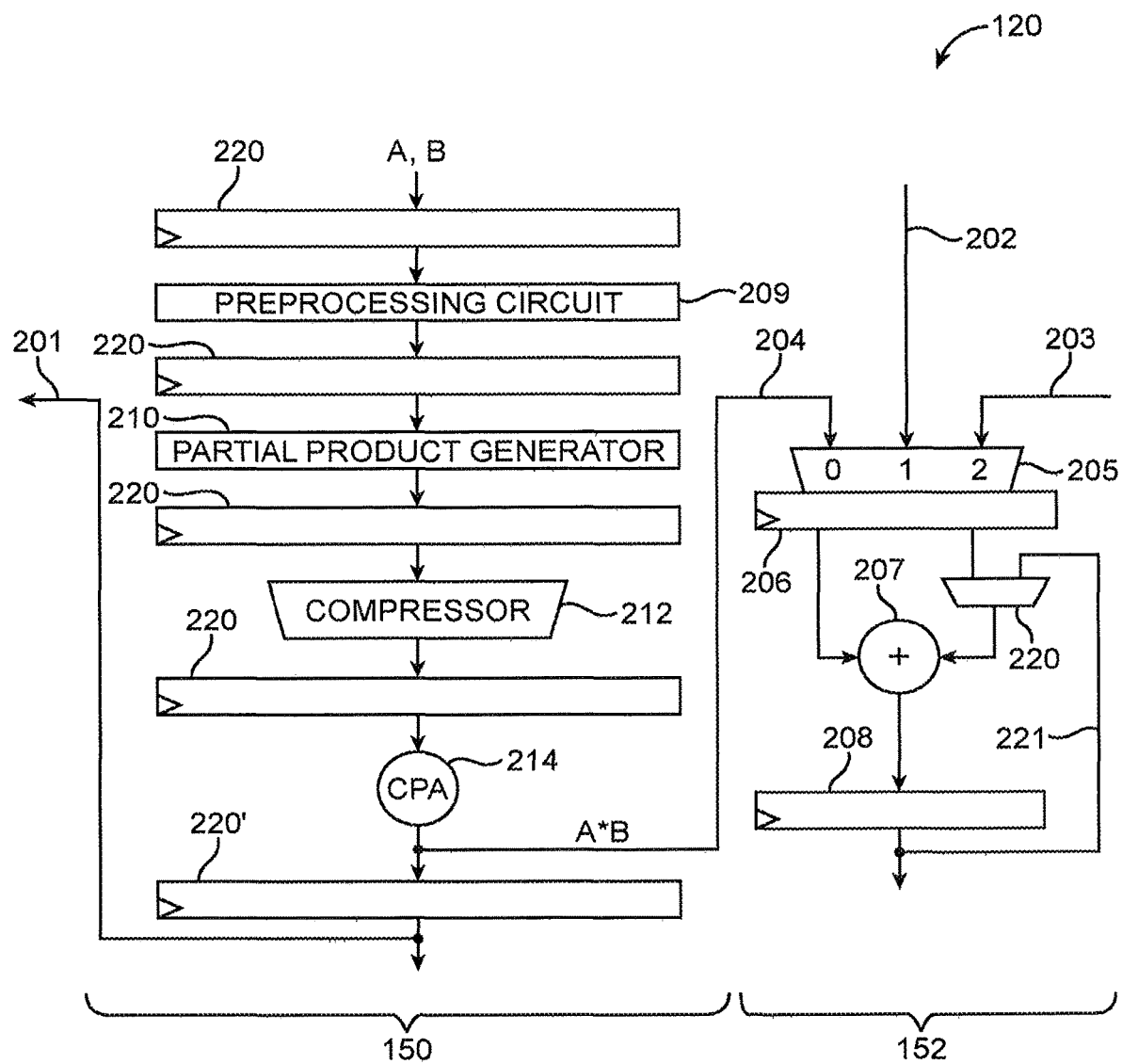
FIG. 3 is diagram of one suitable circuit configuration of a specialized processing block of the type shown in FIG. 2 that is configured to support floating-point multiplication in accordance with an embodiment.

FIG. 3 is diagram of one suitable circuit arrangement of specialized processing block 120 (e.g., a DSP block). As shown in FIG. 3, DSP block 120 may include a number of registers 220, separating multiplier data path 150 into multiple register levels or stages. These registers 220 may be selectively bypassable, typically configured during device programming. In some cases, the direction of registers 220 may be configured differently, such as configuring the input registers at the top to accept input from an adjacent DSP block input register bank, rather than from general-purpose routing.

Each stage may have a register bank 220 associated with it. In some cases, more or fewer register banks may be provided. In yet another case, a register bank may bisect one or more of the stages. The input stage may receive at least two numbers A and B to be multiplied together using multiplier data path 150. Prior to the multiplication operation, circuit 209 may perform processing on inputs A and B, such as pre-adding where two operands are added before they are multiplied by another number. An example use case for this is the implementation of symmetrical FIR filters. Preprocessing circuit 209 may be optional.

After the optional preprocessing, multiplication can begin. The first part of the multiplication is the generation of the partial products, which can be computed using partial product generation circuit 210. The partial products output from circuit 210 may then be summed (after appropriate shifting) to generate the final product.

In ASIC (Application Specific Integrated Circuit) technology, the summation may be split into two different operations: (1) compression and (2) carry propagate addition. First, the partial products are compressed using compression circuit 212, which may be implemented as Wallace trees, Dadda trees, or other suitable parallel counters. The output of compressor 212 is two redundant form vectors such as a sum vector and a carry vector. These vectors are then added together using a carry propagate adder (CPA) 214. Carry propagate adder 214 may be implemented as a ripple carry adder, a carry look-ahead adder, or a carry prefix adder such as the Kogge-Stone network, Brent-Kung network, and others. The product or result of the multiplication (i.e., A*B, which generated at the output of CPA 214) is then provided as an output to multiplier data path 150, optionally using register bank 220'.

Still referring to FIG. 3, a floating-point multiply-add operation can also be implemented inside DSP block 120. Multiple DSP block results can be combined to implement a dot product, using the connections shown. The output of multiplier data path 150 can be optionally routed to an adjacent DSP block using path 201. The destination DSP block 120 may receive signals from path 201 at its input port 203.

Adder data path 152 may include a floating-point adder 207. A multiplexing network 205 selects between two inputs from three available signals: one from an adjacent DSP block via input port 203 (labeled as input "2" to multiplexer 205), one from general-purpose routing input port 202 (labeled as input "1"), and one from multiplier data path 150 via path 204 (labeled as input "0"). If desired, other signals may be provided as well, such as from the output of register 208 via feedback path 221 that can be switched into use via multiplexer 220, which implements a floating-point accumulator. Other registers may be provided, so that any signal can be latency-matched with any other signal. Preprocessing circuit 209 is generally not used for floating-point operations. Carry propagate adder 214 may include additional circuitry to support rounding and floating point exceptions for the floating-point multiplier. Additional circuitry may be provided to implement the floating-point multiplier exponent calculation.

In accordance with an embodiment, the multiplier data path may be decomposed into smaller multipliers. In one case, a larger multiplier such as a 27×27 integer multiplier (which can also support the 24×24 unsigned multiplication required for the 23 bit mantissa of an IEEE 754 single precision floating-point number) may be split into two smaller multipliers such as 18×18. In another case, the natural data path construction may include at least two 18×18 multipliers, which can optionally be configured to support a single 27×27 multiplication.

These smaller integer multipliers can be used to implement smaller floating-point multipliers such as for the FP16 representation (sometimes referred to as IEEE 754 "half precision") having a 10-bit mantissa, which requires an 11×11 unsigned multiplier. FP16 can be readily supported by an 18×18 multiplier. Additional circuitry may be required to provide desired rounding modes for the smaller multipliers. Additional circuitry may also be required to support exponent and exception handling for the FP16 data paths.

Figure 4:
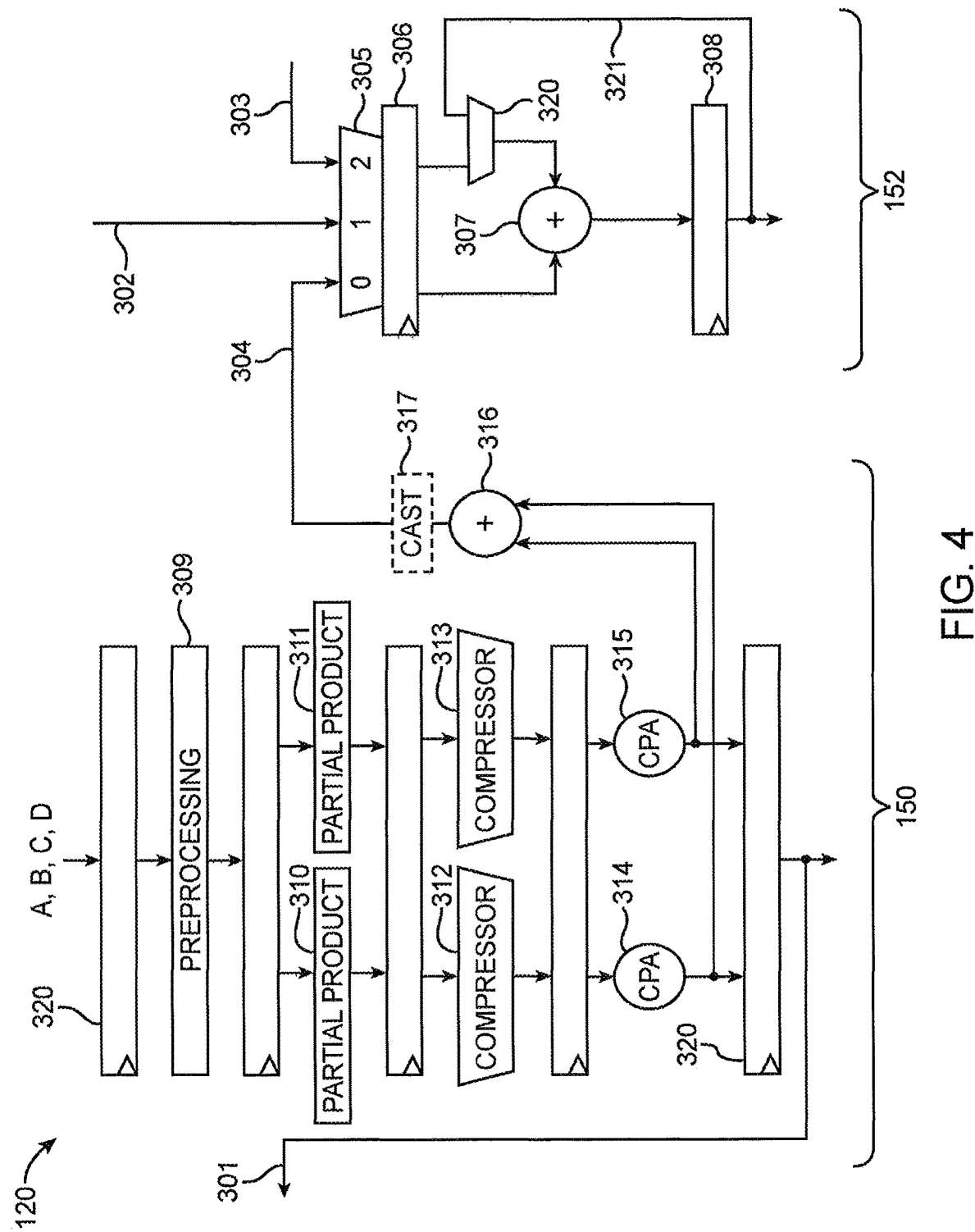
FIG. 4 is a diagram showing how a specialized processing block can be decomposed into multiple sub-circuits to support smaller floating-point multiplication in accordance with an embodiment.

FIG. 4 is a diagram showing how specialized processing block 120 can be decomposed into multiple sub-circuits to support smaller floating-point multiplication (e.g., to support two FP16 multiplications: A*B and C*D). Preprocessor 309 may be decomposed for DSP applications such as where pre-adders are used for symmetric FIR filters, but preprocessing are typically not used for machine learning applications. As shown in FIG. 4, DSP block 120 may include at least two partial product generating circuits 310 and 311, two compression circuits 312 and 313, and two carry propagate adders (CPA) 314 and 315. All of these decomposed component pairs can be combined into a single respective structure when not being used to support machine learning applications.

When multiplier data path 150 is being used as a single data path such as when used for single precision FP32, a single FP32 output can be routed to general-purpose logic or to an adjacent DSP block (e.g., via connection 301).

When multiplier data path 150 is being used to support two smaller data paths such as two FP16 half precision data paths, the two corresponding multiplier results must be summed together before any further processing or routing outside multiplier data path 150. It should be noted that the two smaller multiplier data paths can be operable in a floating-point mode (when being used to perform floating-point multiplication) and in a fixed-point mode (when being used to perform integer multiplication). An adder 316 (e.g., an FP16 adder circuit) may be provided for this purpose. In other words, adder 316 may provide at its output (A*B+C*D) in FP16 format. The sum generated at the output of adder 316 may then be optionally be routed to a higher precision adder such as FP32 adder 307 via multiplexor network 305. At this point, multiple options may now be applied to the further routing and processing of the output of FP16 adder 316.

In one suitable arrangement, the FP16 value generated at the output of adder 316 may be passed through FP32 adder 307 unchanged. To accomplish this, adder 307 may support a mode which passes through a floating-point value without processing it (e.g., by adding that floating-point number with a zero).

In another suitable arrangement, the FP16 value generated at the output of adder 316 can be bypassed around FP32 adder 307 using an additional bypassing multiplexer (not shown in FIG. 4 to avoid unnecessarily obscuring the present embodiments) before register 308.

In yet another suitable arrangement, the FP16 value generated at the output of adder 316 may be promoted or "cast" from FP16 to FP32 using format casting/promoting circuit 317 and processed as an FP32 value. If desired, cast circuit 317 can also be formed as part of adder 316.

The FP32 cast value generated at the output of cast circuit 317 may be handled in various ways. In one configuration, the cast value can be added to a FP32 value from general-purpose routing path 302 to generate a (A*B+C*D+E) function, where A-D are FP16 values received at the input of multiplier data path 150 and E is an FP32 value received at input "1" of multiplexer 305.

In another configuration, the cast value can be combined with other FP32 values from general-purpose routing or from an adjacent DSP block to implement a recursive reduction tree such as required for a dot product. The final output of the dot product will be FP32. As an example, adder 307 may output (A*B+C*D+E*F+G*H), where A-D are FP16 values received at the input of multiplier data path 150 and where (E*F+G*H) is another FP32 cast value routed from an adjacent DSP block, which can be received at input "2" of multiplexer 305.

If desired, the cast value can be accumulated by adder 307 and register 308 by feeding back the output signal using feedback path 321 and multiplexer 320 to generate an FP32 accumulated value.

The examples described above in which an FP32 data path can be decomposed into two FP16 data paths is merely illustrative. In the same way that a larger multiplier can be decomposed into smaller multipliers, the smaller multipliers can in turn be decomposed into even smaller multipliers. In one case, DSP block 120 may be comprised of multipliers of a certain size, such as 18×18, which can be combined into a larger multiplier, such as 27×27, or decomposed into even smaller multipliers, such as 9×9. In general, DSP block 120 may support any precision that can be decomposed into two or more multiplier sub-paths, four or more multiplier sub-paths, etc. As an example, DSP block 120 may be configured to support a single FP64 multiplication, two FP32 multiplications in parallel, or four FP16 multiplications in parallel. Other representations may be used instead.

Since there are multiple levels of potentially different floating point representations, exception and error flags from each of floating point operators should be routed out of DSP block 120 separately. These flags can be inspected at the edge of DSP block 120 independently. For example, each of components 314, 315, 316, and 307 may independently produce exception and error flags (e.g., number status flags indicating a zero, infinity, not-a-number or "NaN", an inexact number, etc.), which can be handled appropriately by the destination operator.

Figure 5:
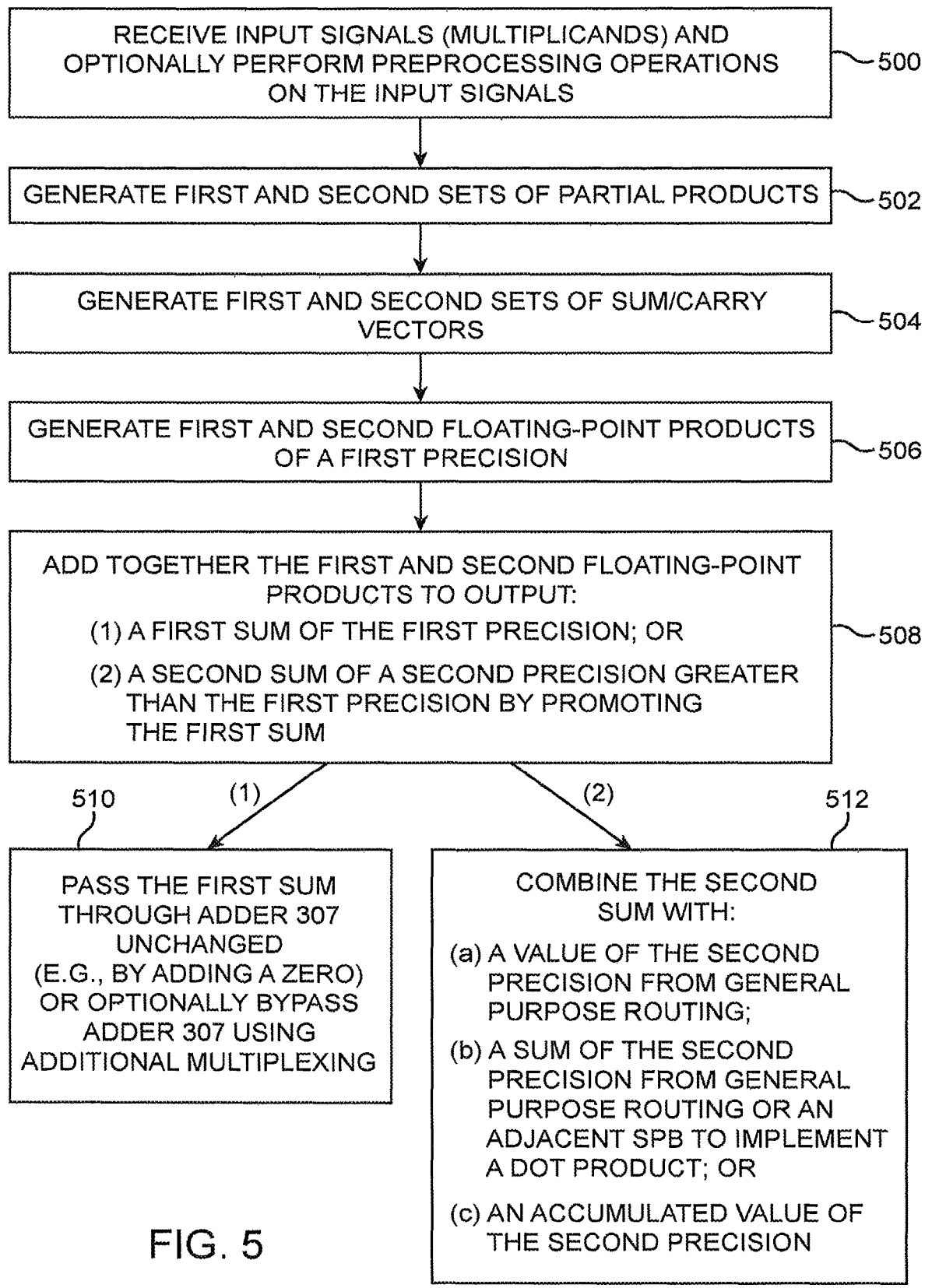
FIG. 5 is a flow chart of illustrative steps for operating a specialized processing block of the type shown in FIG. 4 in accordance with an embodiment.

FIG. 5 is a flow chart of illustrative steps for operating specialized processing block 120 of the type shown in FIG. 4. At step 500, DSP block 120 may receive input signals (sometimes referred to as multiplicands) and may optionally perform preprocessing operations on the input signals using circuit 309.

At step 502, DSP block 120 may generate first and second sets of partial products (e.g., a first partial product generator 310 may generate a first set of partial products, whereas a second partial product generator 311 may generate a second set of partial products).

At step 504, DSP block 120 may generate first and second sets of sum and carry vectors (e.g., a first compressor 312 may generate a first set of sum/carry vectors, whereas a second compressor 313 may generate a second set of sum/carry vectors).

At step 506, DSP block 120 may generate first and second floating-point products of a first precision (e.g., CPA 314 may output a first FP16 product A*B, whereas CPA 315 may output a second FP16 product C*D).

At step 508, DSP block 120 may add together the first and second floating-point products generated using CPA 314 and 315 to output either: (1) a first sum of the first precision or (2) a second sum of a second precision greater than the first precision by promoting/casting the first sum. For example, the first sum may be an FP16 value, whereas the second sum may be a promoted FP32 value.

When processing the first sum, the first sum may be passed through adder 307 unchanged (e.g., by adding a zero to the first sum at adder 307) or optionally bypassed around adder 307 using additional multiplexing circuitry (step 510).

When processing the second sum, the second sum may be combined with either: (a) a value of the second precision received from general-purpose routing port 302, (b) a sum of the second precision from general-purpose routing port 302 or an adjacent DSP block via input port 303, or (c) an accumulated value of the second precision (see, e.g., step 512).

These steps are merely illustrative and are not intended to limit the present embodiments. The existing steps may be modified or omitted; some of the steps may be performed in parallel; additional steps may be added; and the order of certain steps may be reversed or altered.

Figure 6:
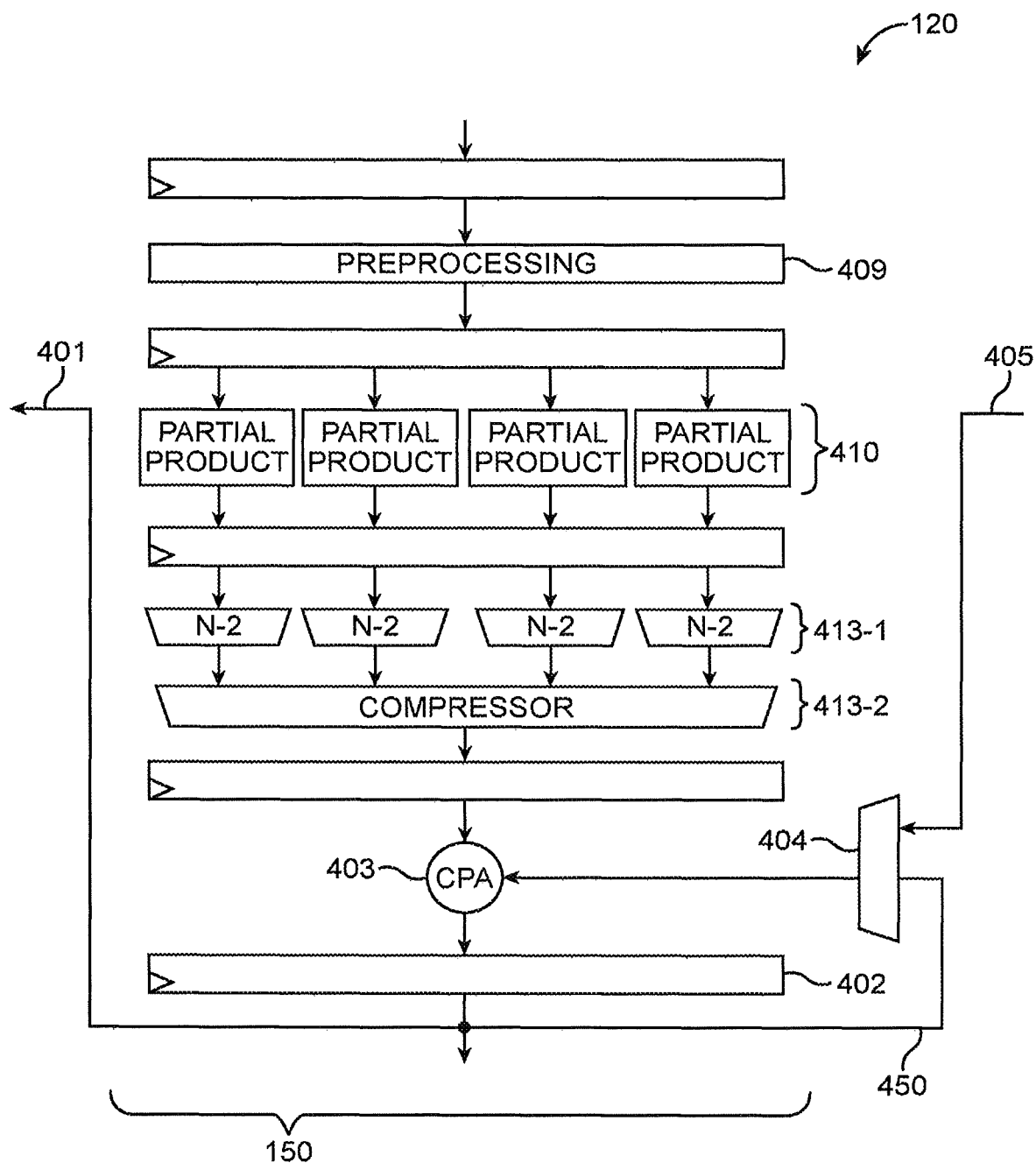
FIG. 6 is a diagram of an illustrative specialized processing block configured to support integer multiply operations in accordance with an embodiment.

In additional to supporting floating-point multiplication operations, DSP block 120 may also be operable to support fixed-point integer multiplication. FIG. 6 is a diagram of DSP block 120 configured to support integer multiply operations in accordance with another embodiment. In particular, DSP block 120 of FIG. 6 may include two 18×18 multipliers, which have been further decomposed into four 9×9 multipliers.

As shown in FIG. 6, four partial product generators 410 (decomposed from two 18×18 partial product generators) feed four compressors 413-1 (also decomposed from two 18×18 compressors). An additional compressor 413-2 may be provided to sum together all of the smaller compressor outputs. In one case, additional compressor 413-2 reuses circuitry from the two 18×18 compressors.

Similar to the FP16 case where I/O complexity can be reduced by summing the FP16 multiplications before routing out of DSP block 120 or further processing, the 9×9 multipliers may also be summed together first using CPA 403. In many machine learning and inference algorithms, the summing together of multipliers is a natural part of the implementation. It is rare that an individual multiplier result is required in machine learning. The sum of four 9×9 multipliers can be routed out of the DSP Block to general-purpose routing, or it can be routed to an adjacent DSP block via path 401.

A DSP block can route in a summed set of 9×9s via port 405, where it can be added to make a sum of eight 9×9s. This can be continued indefinitely in a sequential format, by routing summed results from one DSP block to another. If not pipelined, this will soon create a slow path through the chained adders 403. If this path is pipelined, balancing registers will likely be required outside DSP block 120 to align all the summed values at the destination adder.

If desired, the sum of 9×9s can also be accumulated. Adder 403 is much larger than the precision required by a sum of 9×9s, as it must accommodate at least a 27×27 multiplier. The accumulator feedback path 450 can be selected by multiplexer 404. In another case, the accumulator feedback path 450 and input path 405 can be simultaneously added to adder 403.

The example of FIG. 6 in which DSP block 120 is decomposed into four 9×9 integer multipliers is merely illustrative. In general, DSP block 120 may be organized into any suitable number of smaller integer multipliers (e.g., two or more fixed-point multipliers, more than four fixed-point multipliers, eight or more fixed-point multipliers, etc.).

The circuitry of FIGS. 3, 4, and 6 are not mutually exclusive. In other words, DSP block 120 can be configured to support a single multiplication of a larger precision (e.g., FP32 or FP64) or decomposed to support multiple floating-point or integer multiplications of a relatively smaller precision (e.g., FP16 or 9×9). DSP block 120 configured in this way (e.g., a DSP block that is operable to support multiple smaller precision floating-point operations in a first mode and multiple smaller precision integer operations in a second mode) provides a technical improvement of greatly increasing the functional density for implementing machine learning algorithms.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

EXAMPLES

The following examples pertain to further embodiments.

Example 1 is an integrated circuit, comprising: a first multiplier of a first precision, wherein the first multiplier is configured to output a first product; a second multiplier of the first precision, wherein the second multiplier is configured to output a second product; a first floating-point adder configured to combine the first and second products to generate a first sum; and a second floating-point adder configured to receive the first sum from the first floating-point adder, wherein the second floating-point adder has a second precision that is greater than the first precision.

Example 2 is the integrated circuit of example 1, wherein the first and second multipliers are optionally operable in a floating-point mode and a fixed-point mode.

Example 3 is the integrated circuit of example 1, wherein the first floating-point adder optionally exhibits the first precision.

Example 4 is the integrated circuit of example 1, optionally further comprising a casting circuit interposed between the first floating-point adder and the second floating-point adder, wherein the casting circuit is configured to promote the first sum from the first precision to the second precision.

Example 5 is the integrated circuit of example 4, wherein the second floating-point adder is optionally further configured to combine the first sum with a second sum of the second precision to implement a dot product.

Example 6 is the integrated circuit of example 4, wherein the second floating-point adder is optionally further configured to output an accumulated value using a feedback path.

Example 7 is the integrated circuit of example 1, wherein the second floating-point adder is optionally further configured to pass through the first sum unchanged or wherein the second floating-point adder is bypassed.

Example 8 is the integrated circuit of example 1, optionally further comprising a multiplexing network interposed between the first floating-point adder and the second floating-point adder.

Example 9 is the integrated circuit of any one of examples 1-8, wherein the first and second multipliers are optionally combined to serve as a single multiplier of the second precision, wherein the first multiplier is optionally further decomposed into a first plurality of multipliers of a third precision that is less than the first precision, and wherein the second multiplier is optionally further decomposed into a second plurality of multipliers of the third precision.

Example 10 is the integrated circuit of any one of examples 1-8, wherein each of the first and second multipliers optionally comprises: a partial product generating circuit; a compression circuit configured to receive signals from the partial product generating circuit; and a carry-propagate adder circuit configured to receive signals from the compression circuit.

Example 11 is a method of operating an integrated circuit, comprising: generating first and second floating-point products of a first precision; adding together the first and second floating-point products to generate a first sum of the first precision; and with a floating-point adder of a second precision greater than the first precision, receiving the first sum.

Example 12 is the method of example 11, wherein generating the first and second floating-point products optionally comprises: receiving input signals; generating first and second sets of partial products from the received input signals; generating first and second sets of sum and carry vectors from the first and second sets of partial products; with a first carry-propagate adder, combining the first set of sum and carry vectors to obtain the first floating-point product; and with a second carry-propagate adder, combining the second set of sum and carry vectors to obtain the second floating-point product.

Example 13 is the method of example 11, optionally further comprising passing the first sum through the floating-point adder unchanged.

Example 14 is the method of any one of examples 11-13, optionally further comprising: with a casting circuit, promoting the first sum from the first precision to the second precision to generate a cast value.

Example 15 is the method of example 14, optionally further comprising: with the floating-point adder, adding the cast value with another sum of the second precision to implement a dot product.

Example 16 is an integrated circuit, comprising: a multiplier data path operable in a floating-point mode and an integer mode; and an adder data path configured to receive signals from the multiplier data path only during the floating-point mode.

Example 17 is the integrated circuit of example 16, wherein the multiplier data path is optionally decomposed into a plurality of smaller multiplier data paths.

Example 18 is the integrated circuit of example 17, wherein each of the smaller multiplier data paths optionally comprises: a partial product generator; a compressor configured to receive signals from the partial product generator; and a carry-propagate adder configured to receive signals from the compressor and to generate a corresponding product.

Example 19 is the integrated circuit of example 18, optionally further comprising an adder configured to receive signals from the multiplier data path and to feed signals into the adder data path.

Example 20 is the integrated circuit of example 19, wherein the adder data path optionally comprises an additional adder, and wherein the adder and the additional adder optionally have different precisions.

Example 21 is an integrated circuit, comprising: means for generating first and second floating-point products of a first precision; means for adding together the first and second floating-point products to generate a first sum of the first precision; and with a floating-point adder of a second precision greater than the first precision, receiving the first sum.

Example 22 is the integrated circuit of example 21, wherein the means for generating the first and second floating-point products optionally comprises: means for receiving input signals; means for generating first and second sets of partial products from the received input signals; means for generating first and second sets of sum and carry vectors from the first and second sets of partial products; means for combining the first set of sum and carry vectors to obtain the first floating-point product; and means for combining the second set of sum and carry vectors to obtain the second floating-point product.

Example 23 is the integrated circuit of example 21, optionally further comprising means for passing the first sum through the floating-point adder unchanged.

Example 24 is the integrated circuit of any one of examples 21-23, optionally further comprising: means for promoting the first sum from the first precision to the second precision to generate a cast value.

Example 25 is the integrated circuit of example 24, optionally further comprising: means for adding the cast value with another sum of the second precision to implement a dot product.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
   a multiplier data path operable in a floating-point mode and a fixed-point mode;
   an adder data path configurable to receive signals from the multiplier data path only during the floating-point mode; and
   an adder operable to receive multiplier output signals from the multiplier data path and to feed the signals into the multiplier data path, wherein the adder comprises an additional adder, and the adder and the additional adder have different precisions.

2. The integrated circuit of claim 1, wherein the multiplier data path is decomposed into a plurality of smaller multiplier data paths.

3. The integrated circuit of claim 2, wherein each of the smaller multiplier data paths comprises:
   a partial product generator;
   a compressor operable to receive signals from the partial product generator; and
   a carry-propagate adder operable to receive signals from the compressor and to generate a corresponding product.

4. The integrated circuit of claim 1, wherein the adder is operable to perform arithmetic operations on the signals from the multiplier data path with one or more floating-point values.

5. The integrated circuit of claim 4, wherein the adder receives the one or more floating-point values via a multiplexing data path.

6. The integrated circuit of claim 5, wherein the multiplexing data path is operable to:
   receive a first floating-point input from the multiplier data path, a second floating-point input from an adjacent digital signal processing (DSP) block, and a third floating-point input from an input to the multiplexing data path; and
   select at least two from the first floating-point input, the second floating-point input, and the third floating-point input to transmit to the adder data path.

7. A method of operating an integrated circuit, comprising:
   receiving a selection of a floating-point mode for the integrated circuit, wherein the selection is made between the floating-point mode and an integer mode;
   generating, via a multiplier data path, an output signal, wherein the multiplier data path is decomposed into a plurality of smaller multiplier data paths that each includes a partial product generator, a compressor operable to receive signals from the partial product generator, and a carry-propagate adder operable to receive a compressor output from the compressor and to generate a corresponding product to generate the output signal; and
   transmitting, via the multiplier data path, the output signal to an adder to act on the output signal to generate signals and to feed the signals into an adder data path when the integrated circuit is in the floating-point mode.

8. The method of claim 7, wherein the multiplier data path is operable in the floating-point mode and the integer mode.

9. The method of claim 7, wherein the multiplier data path comprises a multiplier with a first precision, where the multiplier is operable to output a product with the first precision.

10. The method of claim 9, wherein the multiplier data path generates the output signal based at least on the product.

11. The method of claim 7, comprising transmitting, via the multiplier data path, the output signal to an adjacent digital signal processing (DSP) block.

12. An integrated circuit, comprising:
    a multiplier data path comprising a plurality of data paths operable to generate a first floating-point product with a first precision through a first data path of the plurality of data paths and a second floating-point product with the first precision through a second data path of the plurality of data paths, where the multiplier data path is operable in a floating-point mode and a fixed-point mode; and
    an adder data path comprising:
    a first floating-point adder of the first precision, wherein the first floating-point adder is operable to add the first floating-point product and the second floating-point product to generate a first sum with the first precision; and
    a second floating-point adder of a second precision greater than the first precision, wherein the second floating-point adder is operable to add the first sum with an input.

13. The integrated circuit of claim 12, wherein the input to the second floating-point adder is received from a first adjacent digital signal processing (DSP) block.

14. The integrated circuit of claim 13, wherein the multiplier data path transmits the first floating-point product and the second floating-point product to a second adjacent DSP block.

15. The integrated circuit of claim 12, wherein the adder data path is operable to pass the first sum through the second floating-point adder unchanged.

16. The integrated circuit of claim 12, wherein the multiplier data path is operable to generate a third floating-point product with the second precision through the first data path and the second data path.

17. The integrated circuit of claim 12, wherein the second floating-point adder is operable to output an accumulated value using a feedback path.

* * * * *